United States Patent [19]

Coker

[11] 4,386,672

[45] Jun. 7, 1983

[54] DETACHABLE ELECTRIC DRIVE UNIT FOR WHEELCHAIR

[76] Inventor: Theodore R. Coker, 5500 N. Bay Ridge Ave., Milwaukee, Wis. 53217

[21] Appl. No.: 272,536

[22] Filed: Jun. 11, 1981

[51] Int. Cl.$^3$ .................. B60K 1/00

[52] U.S. Cl. .................. 180/13; 180/DIG. 3

[58] Field of Search .................. 180/13, 12, 11, 214, 180/DIG. 3, 907

[56] References Cited

U.S. PATENT DOCUMENTS 2,892,506 6/1959 Slater .................. 180/DIG. 3

3,387,681 6/1968 Rabjohn .................. 180/13

FOREIGN PATENT DOCUMENTS 2061543 7/1971 Fed. Rep. of Germany ... 180/DIG. 3

*Primary Examiner*—John A. Pekar

[57] ABSTRACT

A battery powered steerable electric drive unit for detachable connection to a conventional wheelchair comprises: a framework releasably connectable to the wheelchair frame by snap-on connectors; a drive assembly pivotably (steerably) mounted on the framework and including a ground-engaging wheel and battery-powered electric motor for driving the wheel; a detachable steering column pivotably and rotatably mounted on the framework and operatively connected to the drive assembly to effect steering when rotated about its longitudinal axis; a handle mounted transversley on the steering column and rotatable in opposite directions to various positions about its horizontal longitudinal axis; and an electric controller including switches responsive to handle rotation to control the direction and speed of motor rotation.

10 Claims, 18 Drawing Figures

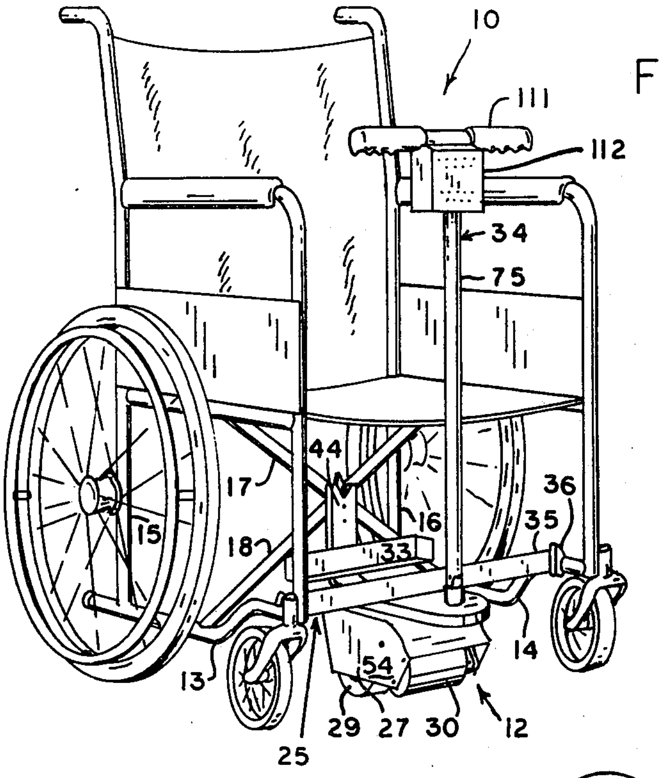
FIG. 1
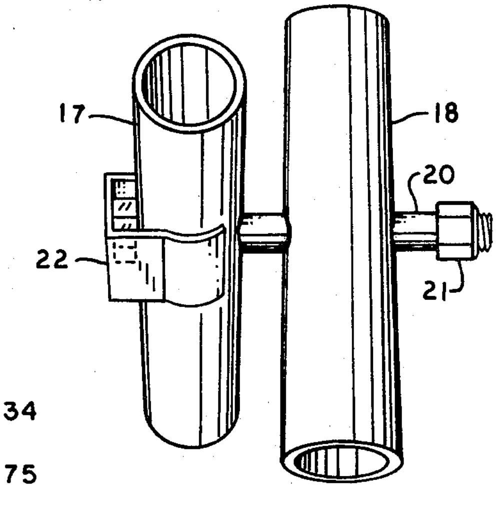
FIG. 3
FIG. 2
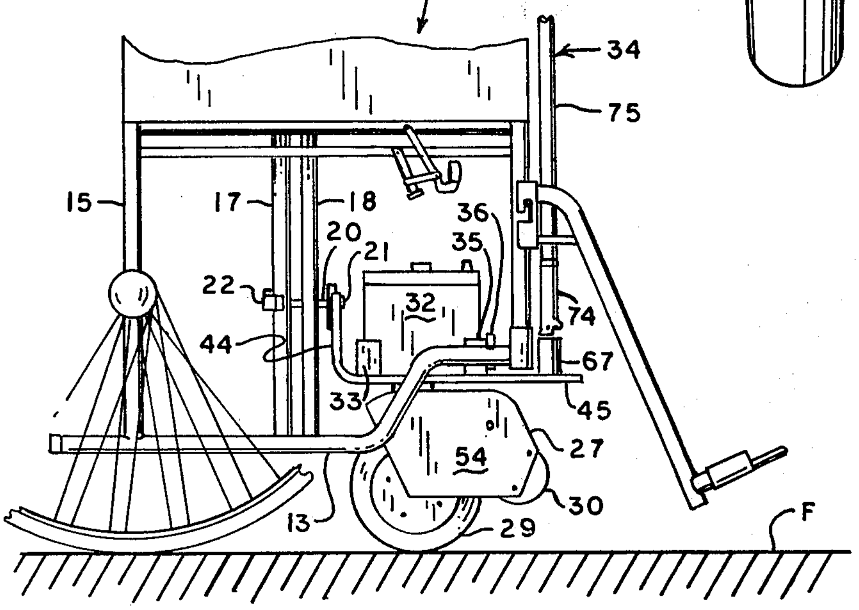

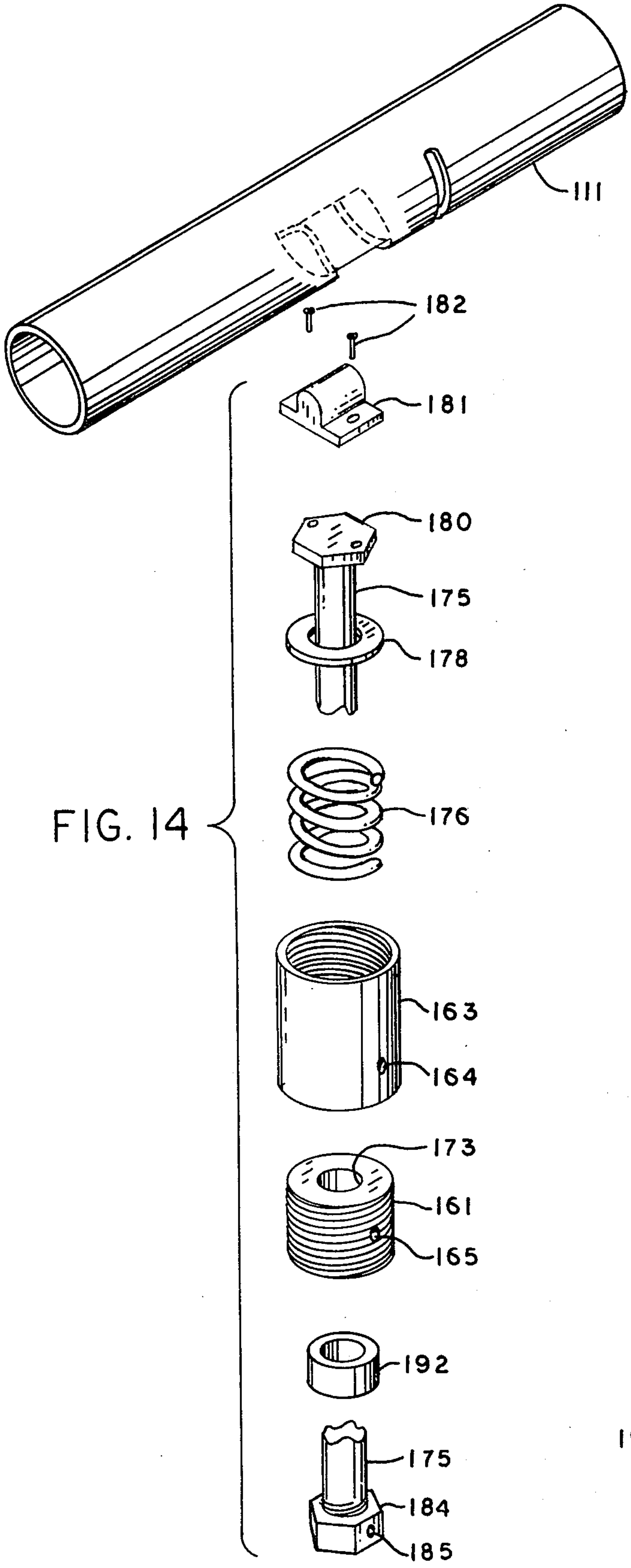
FIG. 14
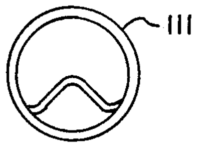
FIG. 15
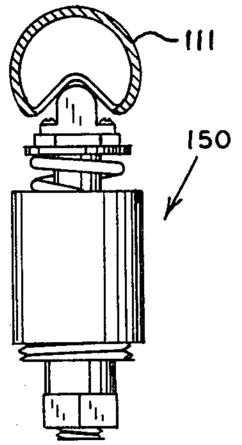
FIG. 16
FIG. 17
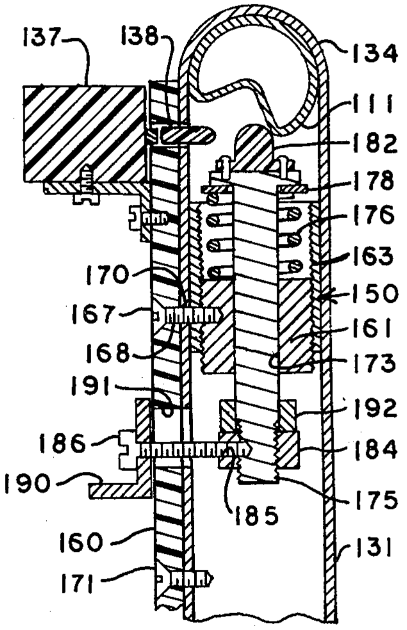

DETACHABLE ELECTRIC DRIVE UNIT FOR WHEELCHAIR

BACKGROUND OF THE INVENTION

1. Field of Use

This invention relates to electric battery powered detachably connectable drive units for wheelchairs.

2. Description of the Prior Art

Various types of battery powered drive units for wheelchairs are known or in use and U.S. Pat. Nos. 3,921,744; 3,912,032; and 3,939,931 illustrate the state of the art of detachable drive units. The following U.S. patents disclose detachable drive units adapted for propulsion of equipment other than wheelchairs, such as trailers and golf carts: Nos. 4,210,217; 4,037,678; 4,105,084; 4,019,597.

Some prior art detachable drive units are relatively complex and costly to manufacture and are difficult or impossible to attach to a wheelchair unless the latter has been specially constructed or modified to accept the detachable unit. Furthermore, some units when in place prevent or interfere with easy user ingress to or egress from the chair. Also, some units cannot be easily operated or controlled by anyone, such as an attendant, except an occupant of the wheelchair, thus making it difficult to move the chair while the unit is attached.

SUMMARY OF THE PRESENT INVENTION

In accordance with the present invention, there is provided an improved detachable steerable controllable battery powered electric drive unit for a conventional wheelchair.

The unit comprises a supporting framework; connection means on the framework for detachably connecting the unit near the front of the wheelchair; a drive assembly pivotably (steerably) mounted on the framework and including a ground-engaging drive wheel and a battery-energizable electric motor for driving the wheel; a storage battery for the motor mounted on the framework; and a speed control and steering handle assembly mounted on the framework and operatively connected to effect steering movement of the drive assembly and to effect speed and directional control of the motor.

The speed control and steering handle assembly comprises a steering column pivotably and rotatably mounted on the framework; a speed control handle rotatably mounted on the steering column; and an electrical controller mounted on the steering column and operatively connected to the speed control handle, to the battery and to the motor.

A drive unit in accordance with the invention offers numerous advantages over prior art units. For example, it is readily usable with most conventional wheelchairs and does not require modification of the latter. It is easy to attach to or detach from a wheelchair. When attached, its steering column, being connected by a universal joint to its framework, can be swung forward and/or sideways out of the way to allow user ingress to and egress from the wheelchair. This feature also allows a non-occupant of the chair, such as a nurse or attendant, to easily control and steer the chair while moving it to a desired location. It is simple to control and its control system relies on natural or "instinctive" user motions to effect steering, forward/rearward movement, and speed control. It is compact and non-obstructive so that when in place on a wheelchair it does not inhibit the maneuverability of the wheelchair. It is of modular construction and is easily and quickly disassembled into its component parts for compact storage, commercial display, or shipment. It is relatively simple and straightforward in design and economical to manufacture, as well as being reliable in use. Other objects and advantages will hereinafter appear.

DRAWINGS

FIG. 1 is a perspective view of the right front of a conventional wheelchair using a detachable steerable controllable battery-powered electric drive unit in accordance with the invention;

FIG. 2 is a side elevation view of a portion of the wheelchair and drive unit of FIG. 1;

FIG. 3 is a greatly enlarged view of a pivot bolt on the wheelchair to which the drive unit connects;

FIG. 14 is an enlarged exploded view of the upper end of the steering column of FIGS. 7 and 8;

FIG. 15 is an end elevation view of the rotatable handle of FIGS. 7 and 8;

FIG. 16 is an elevation view of the upper end of the steering column of FIG. 14;

FIG. 17 is a cross section view taken on line 17—17 of FIG. 16.

DESCRIPTION OF A PREFERRED EMBODIMENT

Figure 4:
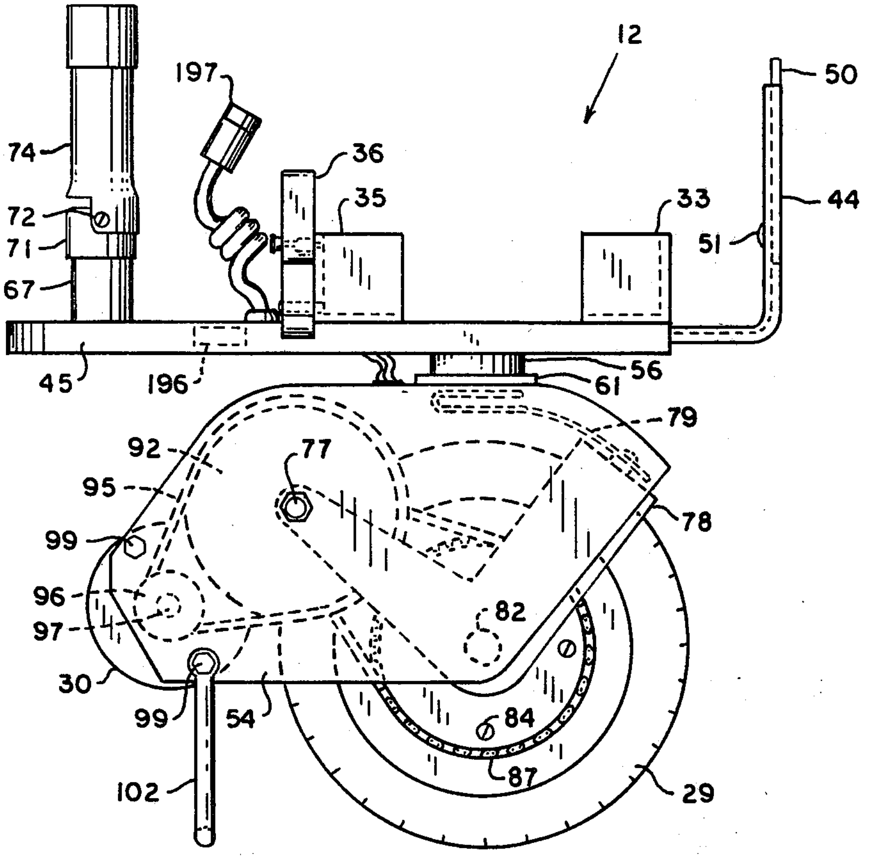
FIG. 4 is an enlarged side elevation view of the drive unit of FIGS. 1 and 2.

Referring to FIGS. 1 and 2, the numeral 10 designates a conventional commercially available foldable wheelchair on which is mounted a detachable steerable controllable battery powered electric drive unit 12 in accordance with the invention. Wheelchair 10 comprises a frame which includes a pair of laterally spaced apart, forwardly and rearwardly extending lower horizontal tubular frame members 13 and 14. The frame members 13 and 14 are rigidly connected to the lower ends of vertical rear frame members 15 and 16, respectively, and to the lower ends of frame cross-braces 17 and 18, respectively. Cross-braces 17 and 18 are pivotally connected to each other by an elongated bolt 20 which has a nut 21 thereon and which allows scissors-like movement of the cross-braces as the wheelchair 10 is folded or unfolded. A bracket 22 in clamped engagement with cross-brace 17 bears against the head of bolt 20 to maintain its nut 21 in an accessable forward position.

Generally considered, drive unit 12 comprises a framework 25 which is detachably connectable to the framework of wheelchair 10; a drive assembly 27 which is pivotably or steerably mounted on framework 25 and comprises a ground-engaging drive wheel 29 and an electric motor 30 for driving the wheel; a storage battery 32 (FIGS. 2, 5 and 18) which is mounted on framework 25 for energizing motor 30; and a motor control and steering assembly 34 which is mounted on framework 25.

As FIGS. 1, 2, 4, 5 and 6 show, framework 25 comprises a rear cross member or battery support 33 and a forward rigid cross-member 35 which is provided at its opposite ends with connectors 36 which releasably secure cross-member 35 between frame members 13 and 14. Each connector 36 is pivotally connected by a pin or rivet 37 to cross-member 35 and is movable from its open or release position (see left side of FIG. 5) to its closed or lock position (see right side of FIG. 5) wherein it is biased by a biasing spring 38. A spring-biased lock-button 40 on connector 36 which engages a hole 41 in cross-member 35 prevents release of a connector 36 unless manually released. Preferrably, cross-member 35 is of such a length so as to force the frame members 13 and 14 apart.

Cross-member 35 is rigidly connected by screws 43 to an L-shaped rear bracket member 44 and to front support plate 45 which also form part of framework 25. Bracket 44 and plate 45 are rigidly secured to each other by the screws 43. Bracket 44 is provided with a V-shaped notch 47 which engages bolt 20 on the frame of wheelchair 10 and with a connector 50 which is also releasably engageable with bolt 20. Connector 50 is pivotably connected by a pin or rivet 51 to member 44 and is movable between open and closed positions, being biased into the latter position by a spring 52. Thus, framework 25 of drive unit 12 is rigidly but releasably secured to the wheelchair frame at three points.

Drive assembly 27 comprises a sheet metal housing 54 which is pivotably secured to the underside of bracket 44 by a bolt 55 which extends through holes in housing 54, a reinforcement plate 61, a lower bushing 56, a washer 57, a driven steering sprocket 58, an upper bushing 59, bracket 44, and plae 45. Bolt 55 is provided with a nut 60. Plate 61 is welded to housing 54 and the bushing 56 is welded to plate 61. Screws 61 rigidly secure sprocket 58 to bushing 56. Screws 43 rigidly secure cross member 35, plate 45, bracket 44 and bushing 59 together.

Driven steering sprocket 58 is connected by an endless flexible steering drive chain 65 (protected by the down-turned flange edge of front support plate 45) to a steering drive sprocket 64 which is rigidly secured to a shaft 65A by a set screw 66. Shaft 65A extends upwardly through a bushing 67 which is rigidly secured by screws 69 in a hole 70 in front support plate 45. Shaft 65A extends into a collar 71 located above bushing 67 and is rigidly secured to collar 71 by a pin 72. Pin 72 also pivotally connects a socket 74 to collar 71. Thus, rotation of socket 74 about its vertical (longitudinal) axis effects pivotal or steering movement of housing 54. Socket 74 is also free to pivot about the horizontal axis of pin 72. As hereinafter explained, socket 74 is adapted to receive the lower end of a steering column 75 of assembly 34.

Figure 5:
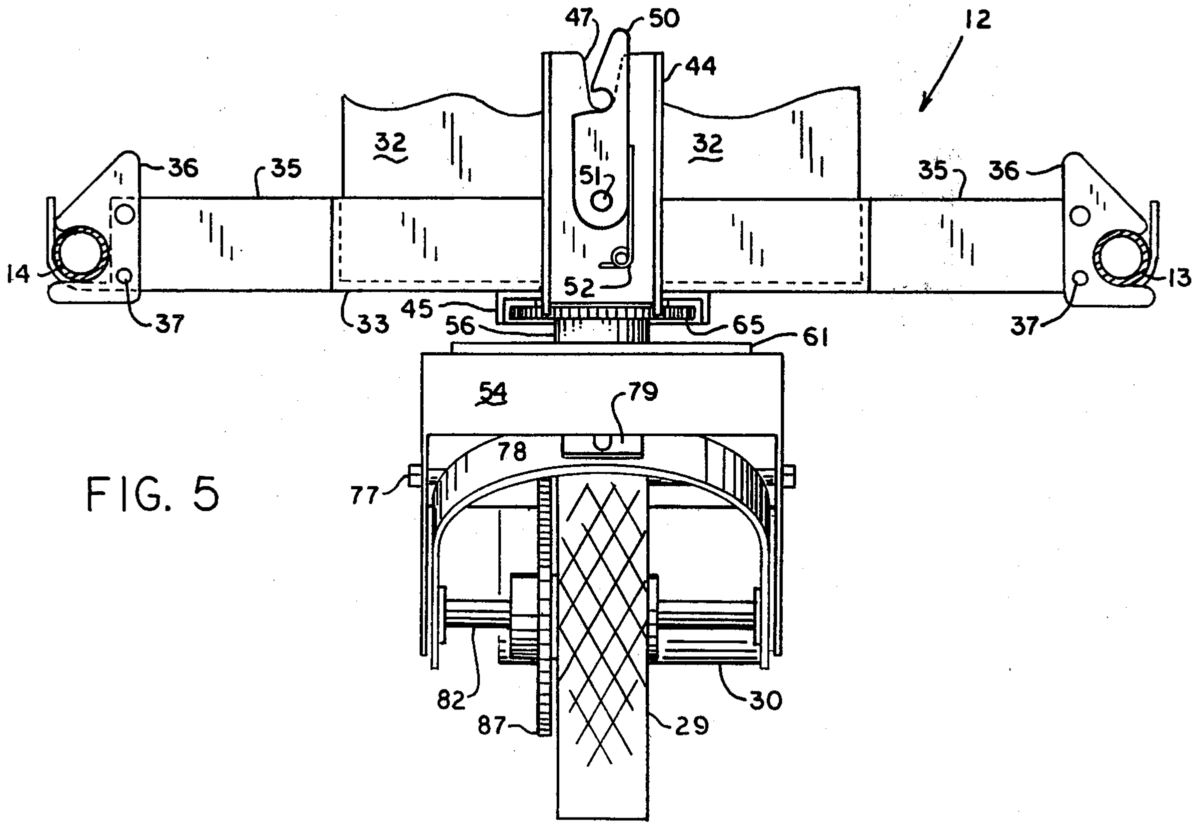
FIG. 5 is a rear elevation view of the drive unit of FIG. 4.
Figure 6:
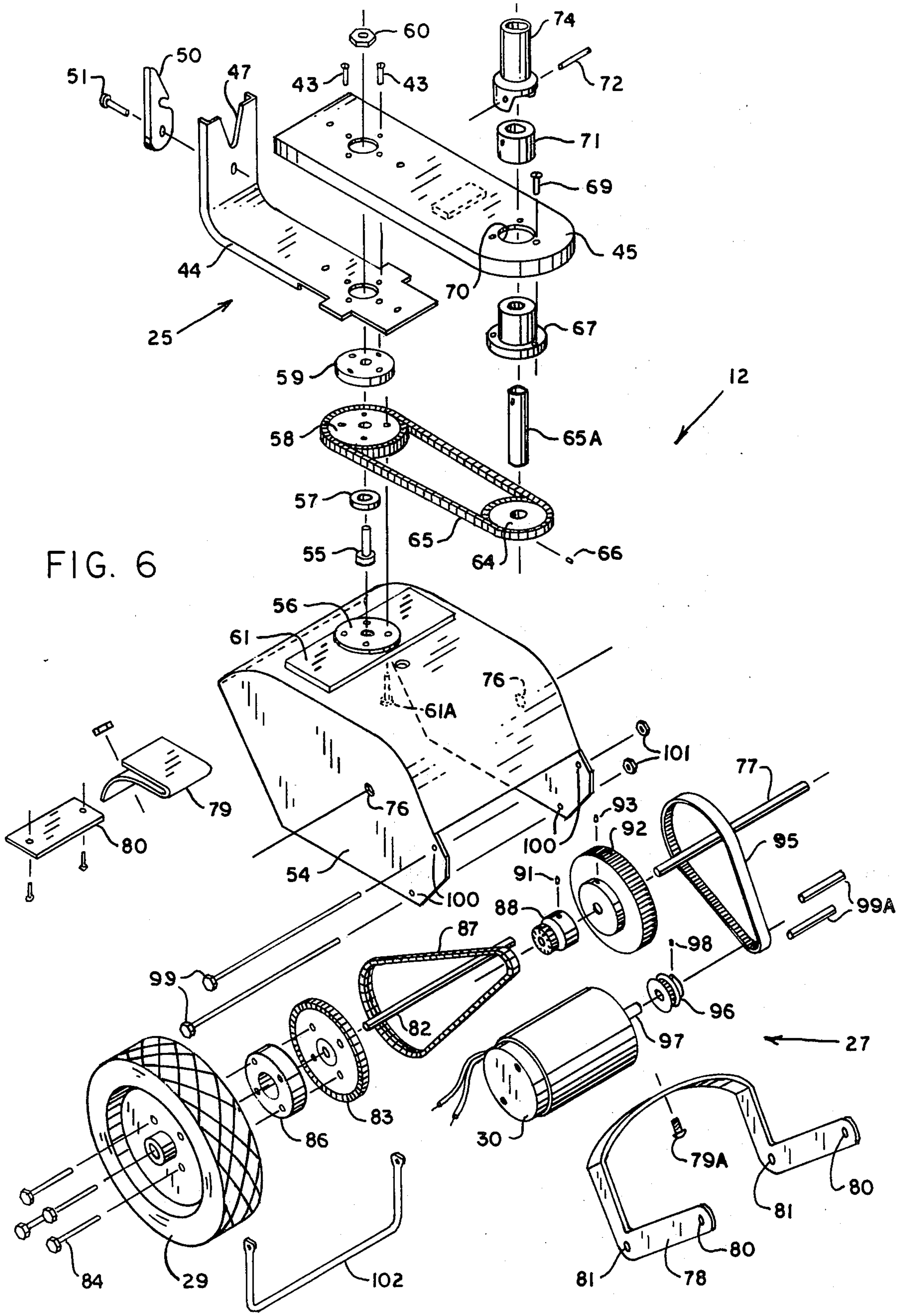
FIG. 6 is an exploded view of the drive unit of FIGS. 1, 2, 4 and 5.
Figure 7:
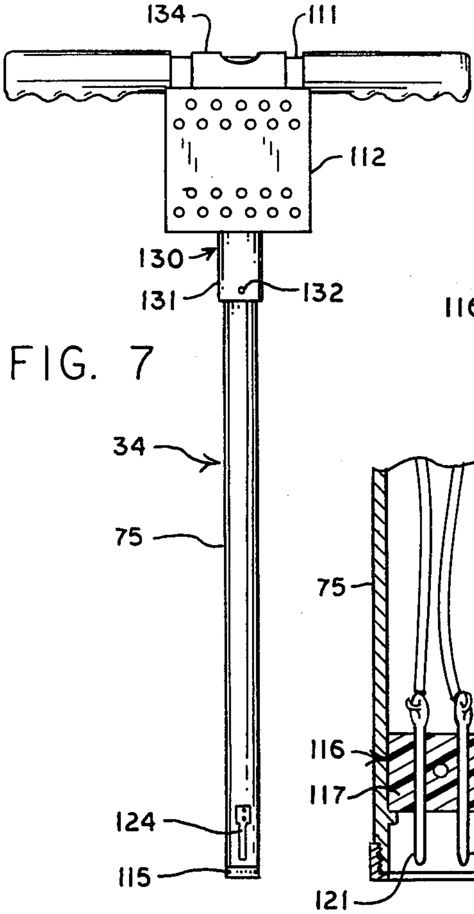
FIG. 7 is a front elevation view of the speed control and steering handle assembly of the drive unit.
Figure 11:
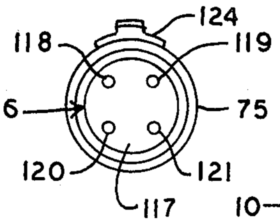
FIG. 11 is a plan view of the lower end of the steering column taken on line 11—11 of FIG. 9.
Figure 10:
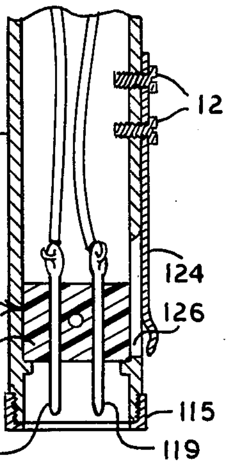
FIG. 10 is a cross-section view taken on line 10—10 of FIG. 9.
Figure 9:
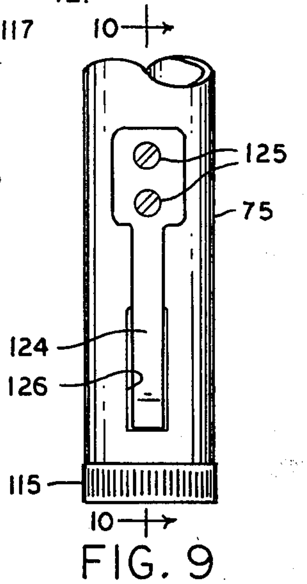
FIG. 9 is an enlarged front elevation view of the lower end of the steering column taken on line 9—9 of FIG. 8.
Figure 8:
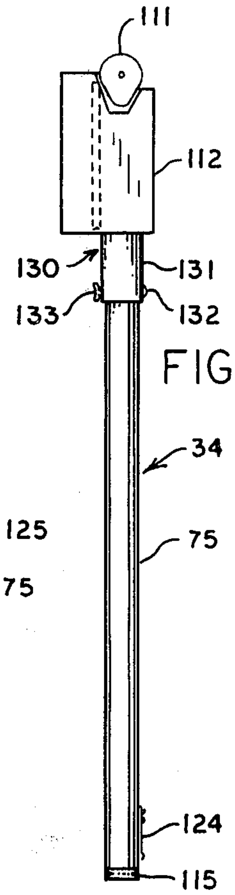
FIG. 8 is a side elevation view of the assembly shown in FIG. 7.
Figure 12:
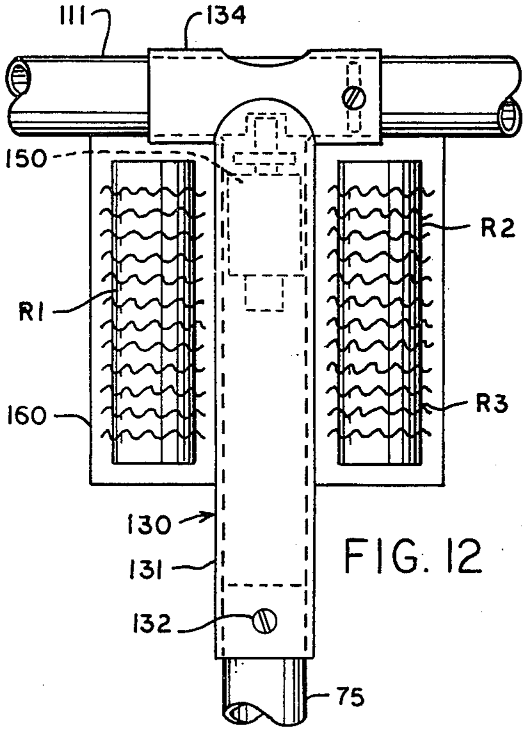
FIG. 12 is an enlarged elevation view of the rear of the interior of the control box of FIGS. 7 and 8 with the cover removed.
Figure 13:
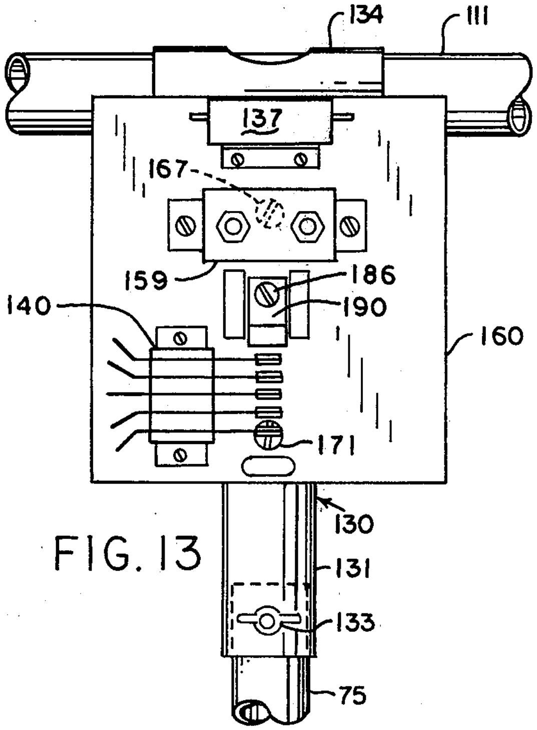
FIG. 13 is a view similar to FIG. 12 of the front of the interior of the control box.

As FIGS. 4, 5 and 6 show, housing 54 includes a pair of holes 76 in the side walls thereof for accommodating a long shaft 77 on which a wheel support bracket 78 is pivotably or rockably mounted by means of a pair of holes 80 in the ends of the bracket 79. A U-shaped biasing spring 79, held in place by a plate 80 on housing 54 engages a bolt 79A on bracket 78 (see FIGS. 4 and 5) to limit travel and provide a biased suspension for bracket 78. Wheel support bracket 78 includes another pair of holes 81 for receiving and supporting an axle 82 on which wheel 29 is rotatably mounted. Wheel 29 is provided with a driven wheel sprocket 83 which is rigidly secured to the side of wheel by bolts 84. Sprocket 83 is spaced outwardly from the side of wheel 29 an appropriate distance by a large spacer or washer 86.

Driven wheel sprocket 83 is connected by an endless flexible drive chain 87 to a small drive sprocket 88 which is rigidly secured to the drive shaft 77 by a set screw 91. Drive shaft 77 also supports a larger driven sprocket 92 which is rigidly secured thereon by a set screw 93. Sprocket 92 is connected by an endless flexible drive belt 95 to a small drive sprocket 96 which is rigidly secured to the drive shaft 97 of electric motor 30 by a set screw 98. Motor 30 is rigidly secured to the front interior of housing 54 by a pair of long bolts 99 which extend through holes 100 in housing 54 and which have nuts 101 thereon. Bushings 99A are provided on the bolts 99. The foregoing arrangement allows wheel 29 to move up or down on a resilient suspension to accomodate surface irregularities beneath the wheel while ensuring that drive belt 95 remains tautgh and fully effective to transmit power to the wheel 29 from the stationary motor 30.

A U-shaped support member 102 is pivotably connected to housing 54 by means of the lowermost motor support bolt 99. When member 102 is swung down as shown in FIG. 4, it raises the wheel 29 of drive unit 12 off the floor F (FIG. 2) and facilitates attachment or removal of the drive unit by preventing it from rolling.

As FIGS. 1, 2 and 7 through 17 show, the motor control and steering assembly 34 is detachably mounted on framework 25 of drive unit 12 by means of engagement thereof with the socket 74 on front plate 45, hereinbefore described. Assembly 34 generally comprises a steering column 75, a rotatable handle 111 mounted on the top end thereof, and a control box 112 mounted on the steering column and containing components forming part of the motor control system which shown in schematic form in FIG. 18.

Steering column 75 takes the form of a hollow tube which, as FIGS. 7, 8, 9, 10 and 11 show, is provided at its lower end with a knurled or scored screw-on cap 115 of slightly larger diameter than tube 75 so as to provide a tight friction fit in socket 74. Within the lower end of tube 75 is an electrical connector 116, comprising an insulator 117 and four electrical terminals 118, 119, 120, 121. On the exterior of the lower end of tube 75 is a resilient locking member 124 secured to the tube by screws 125 and is depressable into a slot or hole 126 in tube 75. Locking member 124 transmits vertical rotational forces to socket 74 to effect steering movement of drive unit 12, yet enables steering column 75 to be readily detached from socket 74 upon depression of member 124 into slot 126.

Figure 18:
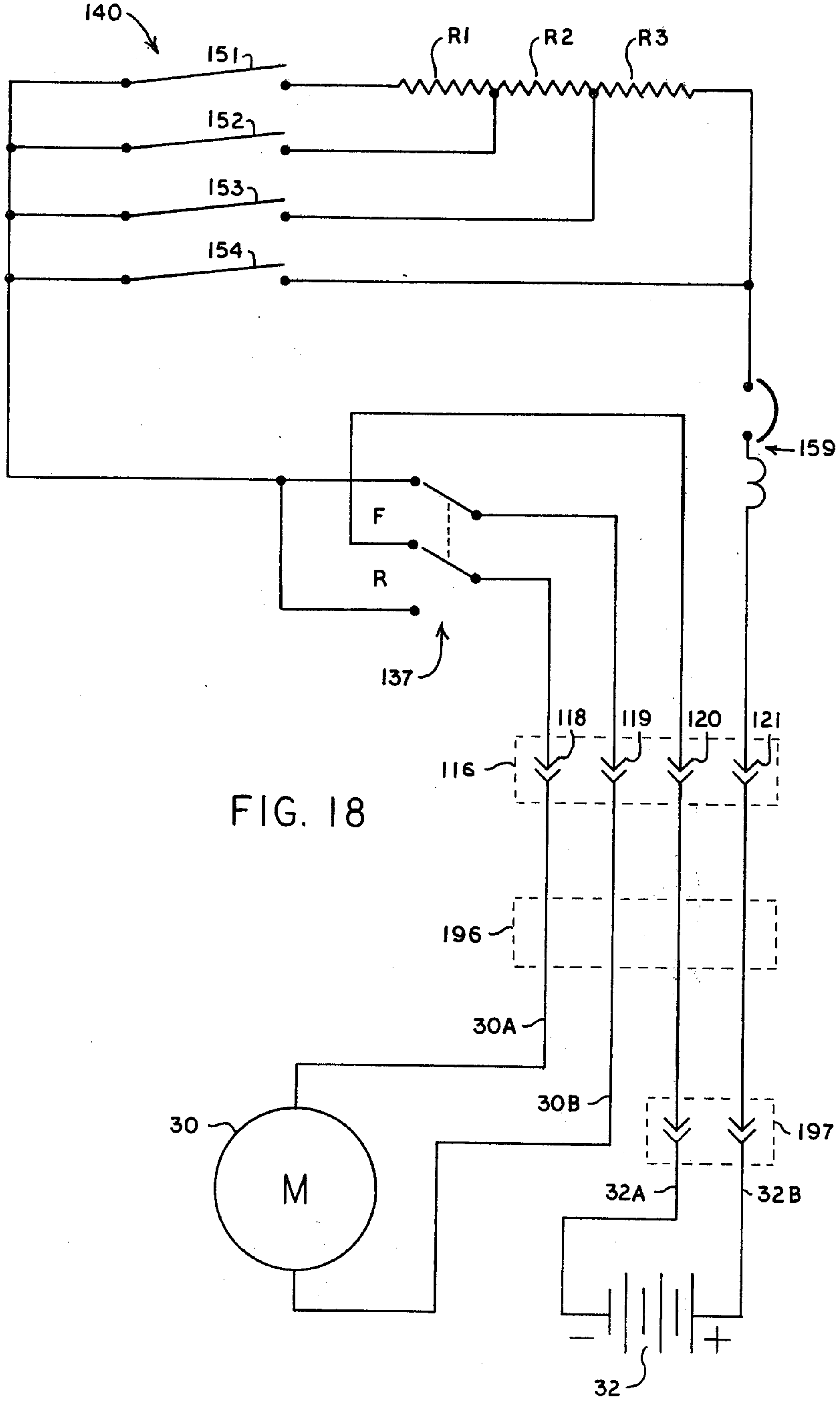
FIG. 18 is an electric circuit diagram of the drive unit.

As FIGS. 12, 13, 14, 15 and 16 show, handle 111 is mounted of the top end of column 75 by means of a T-shaped housing 130 which includes a hollow vertical portion 131 secured and column 75 by a screw 132 having a wing nut 133 and which further includes a hollow cross-tube portion 134 welded to portion 131. Handle 11 is rotatable in either direction about its horizontal axis to effect operation of a two-position reversing switch 137 (FIGS. 13, 17 and 18) which connects motor 30 to battery 32 for operation in the forward direction or the reverse direction. Switch 137 is shown as a microswitch which, when its actuator 138 is not depressed, is normally biased into motor forward position, as FIG. 17 shows. Handle 111 is also rotatable in either direction about its horizontal axis to effect operation of a five-position speed selector switch 140 which connects motor 30 to battery 32 through resistors R1, R2, R3 to control motor speed in either the forward or reverse direction. Switch 140 is shown as a stepping switch which, when its actuator 150 is not depressed, is normally biased open by a spring 152, as shown in FIGS. 17 and 18. Gradual depression of actuator 150 in response to gradual rotation of handle 111 effects sequential closure of the switch elements 151, 152, 153, 154 to place all resistance in circuit initially and then to remove it in sequential steps. Specifically, closure of switch element 151 places R1, R2, R3 in series circuit. Closure of switch element 152 disconnects resistor R1. Closure of switch element 153 disconnects resistor R2. Closure of switch element 154 disconnects resistor R3.

The switches 137 and 140, the resistors R1, R2 and R3, and the switch actuators 138 and 150 are mounted on an insulated circuit board 160. A thermally responsive overload sensing automatically resettable circuit breaker 159 is mounted on board 160.

Switch actuator 150, shown in detail in FIGS. 12, 13, 14, 16, 17 is located within hollow vertical portion 131 of housing 130 and comprises an externally threaded insulating base 161 having a hole 162 there through and base 161 is screwed into an internally threaded hollow sleeve 163. Sleeve 163 and base 161 have screw holes 164 and 165, respectively, for receiving a mounting screw 167 which extend through a hole 168 in circuit board 160 and a hole 170 in vertical portion 131. Screw 167 holds actuator 150 in fixed position and also secures board 160 to portion 131. Another screw 171 also secures board 160 to portion 131. Base 161 has a central hole 173 which slidably receives a vertically movable bolt 175 which is biased upwardly by a compression spring 176 disposed around the bolt between a washer 178 and base 161. The head 180 of bolt 173 has a handle-engaging member 181 secured thereto by screws 182. The nut 184 on the lower end of bolt 173 is provided with a thread lateral opening 185 for receiving a bolt 186 which is rigidly secured to an L-shaped switch element actuator member 190. Bolt 186 extends through a clearance hole 191 in circuit board 160. A collar 192 on bolt 176 limits upward travel of member 190.

As the circuit diagram in FIG. 18 shows, motor 30 is provided with a pair of leads 30A and 30B which are connected to a terminal strip 196 which is located on the underside of bracket 45 (see FIG. 4) and from thence are connected to terminals 118 and 119, respectively, in connector 116. Battery 32 is provided with a pair of leads 32A and 32B which are connected to one side of a plug-in connector 197 (see FIG. 4) and from thence are connected, through terminal strip 196, to terminals 120 and 121, respectively, in connector 116. The foregoing arrangement allows the battery 32 and the column 76 to be quickly and easily detached.

I claim:

1. In an electric drive unit for releasable mounting on a wheelchair;
   a framework;
   means on said framework for releasably connecting said framework to said wheelchair;
   a drive assembly steerably mounted on said framework, said drive assembly including a reversible electric motor and a ground-engageable wheel drivable by said motor;
   a steering column pivotably and rotatably mounted on said framework and operatively connected to said drive assembly to effect steering motion thereof when said column is rotated about its longitudinal axis;
   a handle mounted on said steering column and rotatable in either direction about its longitudinal axis;
   and control means responsive to rotation of said handle for controlling the direction and speed of rotation of said motor.

2. A drive unit according to claim 1 wherein said steering column is detachably mounted on said framework.

3. A drive unit according to claim 1 including means for resiliently mounting said ground-engageable wheel on said drive assembly.

4. A drive unit according to claim 1 wherein said control means includes switch means supported by said steering column and operatively connected to said handle.

5. A drive unit according to claim 4 wherein said switch means includes a first switch for controlling the direction of rotation of said motor and a second switch for controlling the speed of rotation of said motor.

6. In an electric drive unit for a wheelchair;
   a framework including a transverse member and a second member secured to and extending forwardly and rearwardly from said transverse member, said framework having battery supporting means thereon;
   latch means on said transverse member and on said second member for releasably securing said framework to said wheelchair;
   a drive assembly pivotably mounted on said second member of said framework, said drive assembly including a housing, an electric motor mounted on said housing, a ground-engageable wheel mounted on said housing, and wheel drive means connected between said motor and said wheel;
   a steering column;
   universal joint means for pivotably and rotatably mounting said steering column on said second member of said framework; steering drive means connected between said steering column and said drive assembly to effect steering motion of the latter when said steering column is rotated about its longitudinal axis;
   a handle rotatably mounted on said steering column;
   and control means including electric switches mounted on said steering column and responsive to rotational movement of said handle for controlling the direction and speed of rotation of said motor.

7. A drive unit according to claim 6 wherein said steering column is detachably mounted on said framework.

8. A drive unit according to claim 6 or 7 including means for resiliently mounting said ground-engageable wheel on said drive assembly.

9. In an electric drive unit for a wheelchair which has a pair of laterally spaced apart frame members extending fore and aft and a pair of cross members connected together by a pivot pin, each cross member being connected to a frame member:

a framework including a transverse member for disposition between said pair of frame members on said wheelchair and a second member rigidly secured to said transverse member and extending rearwardly therefrom;

connecting means on said framework for releasably connecting said framework to said wheelchair, said connecting means comprising first connection means at opposite ends of said transverse member for releasable attachment to said frame members of said wheelchair, and a second connection means on said second member for releasable attachment to said pivot pin on said wheelchair;

a drive assembly steerably mounted on said framework, said drive assembly including a reversible electric motor and a ground-engageable wheel drivable by said motor;

a steering column pivotably and rotatably mounted on said framework and operatively connected to said drive assembly to effect steering motion thereof when said column is rotated about its longitudinal axis;

a handle mounted on said steering column and rotatable in either direction about its longitudinal axis;

and control means responsive to rotation of said handle for controlling the direction and speed of rotation of said motor.

10. In an electric drive unit for releasable mounting on a wheelchair:

a framework;

means on said framework for releasably connecting said framework to said wheelchair;

a drive assembly steerably mounted on said framework, said drive assembly including a reversible electric motor and a ground-engageable wheel drivable by said motor;

a steering column pivotably and rotatably mounted on said framework and operatively connected to said drive assembly to effect steering motion thereof when said column is rotated about its longitudinal axis;

a handle mounted on said steering column and rotatable in either direction about its longitudinal axis;

and control means responsive to rotation of said handle for controlling at least the direction of rotation of said motor.

* * * * *